United States Patent
Gibis

(10) Patent No.: US 11,550,644 B2
(45) Date of Patent: Jan. 10, 2023

(54) CARD DEVICE HAVING APPLETS AND TRANSFER OF APDUS TO APPLETS

(71) Applicant: GIESECKE+DEVRIENT MOBILE SECURITY GMBH, Munich (DE)

(72) Inventor: Oliver Gibis, Munich (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 72 days.

(21) Appl. No.: 16/491,947

(22) PCT Filed: Mar. 5, 2018

(86) PCT No.: PCT/EP2018/000086
§ 371 (c)(1),
(2) Date: Sep. 6, 2019

(87) PCT Pub. No.: WO2018/162117
PCT Pub. Date: Sep. 13, 2018

(65) Prior Publication Data
US 2021/0073055 A1    Mar. 11, 2021

(30) Foreign Application Priority Data

Mar. 6, 2017  (DE) .......................... 102017002151.1

(51) Int. Cl.
*G06F 9/54* (2006.01)
*G06Q 20/34* (2012.01)

(52) U.S. Cl.
CPC ......... *G06F 9/544* (2013.01); *G06Q 20/3574* (2013.01)

(58) Field of Classification Search
CPC ............................ G06F 9/544; G06Q 20/3574
See application file for complete search history.

(56) References Cited

U.S. PATENT DOCUMENTS

| 8,196,131 B1* | 6/2012 | von Behren ......... G06Q 20/382 705/64 |
| 8,646,059 B1* | 2/2014 | von Behren ............ G06F 21/35 719/329 |
| 8,807,440 B1 | 8/2014 | Von Behren et al. |
| 2014/0188713 A1 | 7/2014 | Alimi |
| 2015/0127529 A1 | 5/2015 | Makhotin et al. |
| 2015/0288686 A1 | 10/2015 | Pepin et al. |
| 2016/0086159 A1* | 3/2016 | Golla ................. G06Q 20/3226 705/76 |

FOREIGN PATENT DOCUMENTS

| DE | 102016007189 A1 | 12/2017 |
| EP | 1939822 A1 | 7/2008 |

OTHER PUBLICATIONS

GlobalPlatform Inc., "GlobalPlatform Card Specification Version 2.2.1," pp. 1-303, Jan. 31, 2011.
Sun Microsystems, Inc., "Java Card 2.2 Virtual Machine Specification," pp. 1-302, Jun. 2002.
German Patent Examination for DE Application No. 102017002151.1, Feb. 2, 2018.
International Search Report from PCT Application No. PCT/EP2018/000086, Jul. 26, 2018.

* cited by examiner

*Primary Examiner* — S. Sough
*Assistant Examiner* — Kimberly L Jordan
(74) *Attorney, Agent, or Firm* — Workman Nydegger

(57) ABSTRACT

The invention produces a card device having functional applets and an AID applet, as well as a relaying table that forwards commands addressed to the AID applet to functional applets.

16 Claims, 1 Drawing Sheet

T → AID ** + Bed1+Bed2        Applet (1) AID X + CL + int        -> Applet A (int)
(2) AID A + C + int         -> Applet A (int)
(3) AID X + C + dom         -> Applet B (dom)
(4) AID B + CL + dom        -> Applet B (dom)
....

AID ** + Bed1+Bed2          Applet (1) AID X + CL + int        -> Applet A (int)
(2) AID A + C + int         -> Applet A (int)
(3) AID B + C + dom         -> Applet B (dom)
(4) AID X + CL + dom        -> Applet A (int)
....

CARD DEVICE HAVING APPLETS AND TRANSFER OF APDUS TO APPLETS

FIELD OF THE INVENTION

The invention relates to a resource-limited card device, in particular a card device based on the Java Card technology or the native technology, in particular a chip card, a chip card module, or a chip card module in a housing of any desired form factor, or a virtual chip card set up in a mobile terminal. The card device can in particular be equipped with the functionality of a payment transaction card or with a SIM functionality (SIM=subscriber identity module for mobile communication). Applets in the card device can be addressed with commands, for example APDUs.

STATE OF THE ART

A resource-limited card device comprises a microprocessor having an operating system (OS) implemented thereon (e.g. Java Card OS or native OS) and an applet memory for implementing applets. Functionalities of the card device are achieved by applets implemented in the card device. For example, one or several payment transaction applets are implemented in a card device with the functionality of a payment transaction card. Payment transaction cards are implemented in the card format, for example ID 1, and as virtual payment transaction cards implemented as applications in a mobile telephone. For a card device with SIM functionality (SIM=subscriber identity module) for using a mobile-communication capable terminal in a mobile communication network, one or several SIM-specific applets are implemented in the card device.

The loading of an applet into a card device by means of APDU commands is specified in the document [1] Global Card Platform Specification V2.2.1, 2011, hereinafter also referred to by the official short reference GPC_SPE_034. According to [1] GPC_SPE_034, chapter 9, in particular chapter 9.3, an applet is installed in a card device by a load packet for the applet being loaded into the card device with a/several LOAD command(s) (9.3.2), and an instance of the applet being installed in the card device with the content of the load packet with an INSTALL command (9.3.3 et seq.). According to [1] GPC_SPE_034, chapter 9.3.6, page 84, upon the installation of the applet instance by means of the INSTALL command, it is ensured in particular with an INSTALL FOR INSTALL that the applet identifier AID of the applet is stored in the registry of the Java Card device. This circumstance is represented in FIG. 9-2(page 92) by the entry "install and register Application". According to [1] GPC_SPE_034, chapter 11, the structure of the INSTALL APDU command is described. According to sub-chapter 11.5.2.3.2, table 11-43, the application AID of an applet to be installed is transferred in the data field of the INSTALL command, namely in the sub-field "Application AID".

According to [1] GPC_SPE_034, each applet to be installed thus has exactly one application identifier (AID). Further, the AID and the applet instance are installed in the card device from one and the same load packet. Later, upon calling the applet instance, the applet instance can be addressed exclusively with the AID from the same load packet. If it is intended to be possible to call an applet with different AIDs, a separate instance of the applet has to be generated from this load packet for each of the different AIDs, and thus, further, separate applet instances are created in the card device.

Global Platform knows the shareable interface mechanism, which allows communication, in particular data exchange, between applet instances originating from different load packets.

In a payment transaction card which accommodates several payment transaction applets and which is to be usable in several countries and/or which supports several access possibilities (in particular contactless/contact-type), a separate applet instance must be created and a separate applet AID must be provided for each constellation of, for example, applet, country and access possibility.

Examples: Instance 1 (A-1) applet A in country X contact-type; instance 2 (A-2) applet A in country Y contact-type; instance 3 (B-1) applet B in country X contact-type; instance 4 (B-2) applet B in country Y contact-type; instance 5 (A-3) applet A in country X contactless; instance 6 (A-4) applet A in country Y contactless; etc. The multiplicity of 6 applet instances requires much memory space. However, with respect to function, all four (two) applet instances which are based on the same applet A (B) are largely identical. Merely the conditions under which the card device is addressed are different; in the above examples the type of contacting contactless or contact-type, and the country of operation.

In the patent application DE 102016007189.3 of the applicant of the present patent application, a mechanism is stated with which two AIDs can be created for one and the same applet instance.

OBJECT OF THE INVENTION

The invention is based on the object of producing a card device which allows a memory-saving installation of applets which can be employed under different conditions. Further, a method is to be stated for relaying commands to applet instances in such a resource-limited card device. In particular, the card device and/or method is to offer a mechanism of relaying to the same applet commands that come in under different conditions without having to create several instances of the applet in the card device.

SUMMARY OF THE INVENTION

The object is achieved by a card device according to claim 1 and a method according to the independent claim. Advantageous embodiments of the invention are stated in the dependent claims.

The card device according to the invention according to claim 1 comprises, in a non-volatile memory area, an applet instance of one or several functional applets, e.g. payment applets (payment transaction applets) or mobile-communication network access applets, and for each installed applet instance one applet identifier AID associated with the applet instance (e.g. as usual in the registry).

According to the invention, the card device further comprises an AID applet instance of a special AID applet, which itself is not a functional applet (payment applet, etc.), but is set up to work through commands coming in at the card device (e.g. APDUs) and to forward these to instances of functional applets. A separate AID applet identifier AID is associated with the AID applet instance and stored in the card device, for example in the registry of the card device, with the other AIDs of the conventional, functional applets. Further, the card device contains a relaying table, which is created in the AID applet itself, or is created such that it can be utilized by the AID applet. The relaying table (1) mutually associates the AID of the AID applet plus conditions of commands coming in at the card device and (2) mutually associates applets installed in the card device. When a command comes in at the card device and is transferred from the JavaCard OS to the AID applet, the AID applet (or its instance in the card device) accepts the command, evaluates the relaying table and forwards the command to the correct/ respective functional applet to be employed in accordance with the conditions stored in the relaying table. For the relaying of commands between the applets to be carried out, both the AID applet instance and the instances of the functional applets each have a mutually coordinated interface unit, for example a shareable interface object, to set up a shareable interface between the various applets.

In this way it is possible to use one command (e.g. APDU) to address a particular applet instance of a functional applet in the card device in two different ways. Optionally, the applet instance can be addressed either with its own applet identifier. Alternatively, the same applet instance can be addressed with the applet identifier of the AID applet plus the matching conditions for the command to be relayed to this applet instance. There is only one instance of the functional applet behind both relaying options. Space must be provided for the instance of the AID applet and the relaying table. However, with one single instance of the AID applet and the relaying table, a multiplicity of additional instances of functional applets can be avoided.

Via a return functionality, for example a return method, of the interface unit it is possible to optionally return response data in response to a command from the functional applet to the AID applet.

As a condition there can be provided: Contacting type, in particular contactless or contact-type, between the card device and a terminal set up for the operation of the card device; country of operation of the card device; country relationship domestic or abroad between a country of operation of the card device and a home country of the card device in which the card device is registered; or other suitable conditions.

The card device is optionally configured in the Java Card technology or in the native code technology.

Optionally, the usual direct way of relaying commands, with the specific AID of the addressed applet (e.g. AID A for applet A), is preserved in unchanged manner by the relaying mechanism according to the invention via the AID applet and the relaying table.

Optionally, the card device contains respectively one applet instance of an international applet for international operation of the card device outside a home country and/or one applet instance of a home applet for domestic operation of the card device in the home country in which the card device is registered.

BRIEF DESCRIPTION OF THE DRAWINGS

In the following the invention will be explained in more detail on the basis of embodiment examples and with reference to the drawing, in which there is shown.

DETAILED DESCRIPTION OF EMBODIMENT EXAMPLES

Figures 1, 2:
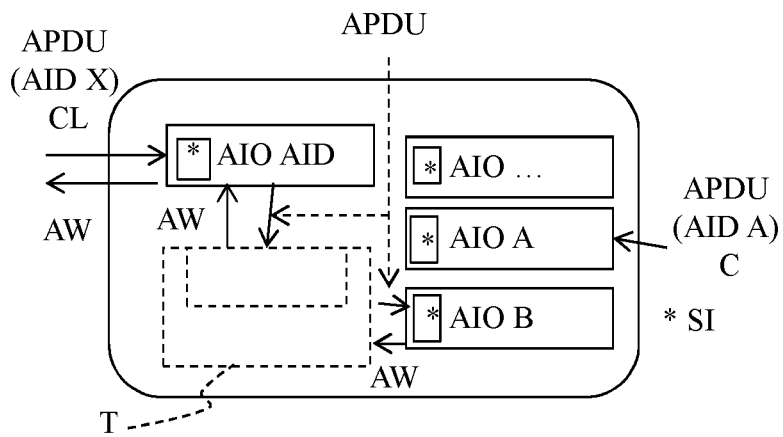
FIG. 1 a card device, which is set up as a payment transaction card with several payment applets, according to embodiments of the invention.
FIG. 2 a variation of the card device of FIG. 2, according to embodiments of the invention.

FIG. 1 shows a card device according to an embodiment of the invention, which is set up as a payment transaction card with several payment applets A, B, . . . . The card device comprises two different functional applets A and B, represented in the card device by applet instances (applet instance objects) AIO A and AIO B. The two functional applets A and B are payment transaction applets which are set up to carry out an electronic payment transaction. The applet A is generally set up for international payment transactions (int). The applet B is generally set up for payment transactions in the home country (domestic payment transactions; dom). The card device further contains an AID applet AIO AID and a relaying table T. The relaying table T contains a plurality of line entries with columns AID, conditions (Bed1, Bed2), applet. The AID applet further contains an interface unit SI, configured here as a shareable interface object according to the Global Platform Standard. The applet instances of those functional applets A, B, . . . which must be able to communicate with the AID applet also contain an interface unit SI, configured as a shareable interface object according to the Global Platform Standard.

In the following, the handling of an APDU command in the card device is considered, by which APDU command a payment transaction is carried out.

An APDU command coming in at the card device of FIG. 1, said APDU command containing an applet identifier AID for the functional applet A, AID A, is routed directly to the applet instance AIO A of the applet A. APDU commands with AID B are routed directly to the AIO B instance of the applet B in an analogous manner.

An APDU command coming in at the card device of FIG. 1, said APDU command containing an applet identifier AID for the AID applet, AID X, is routed to the applet instance AIO AID of the AID applet, i.e. initially to no functional payment transaction applet. The APDU command with AID X shown in FIG. 1 comes in via the contactless interface of the card device. This feature corresponds to a condition Bed1 "contactless" CL in the relaying table T. Further, the card device is currently being used in the international space int. This corresponds to the condition Bed2 int in the relaying table T. The relaying table T indicates that APDU commands with AID X and the condition contactless CL and international space are routed to the applet instance AIO A of the applet A. Correspondingly, the APDU command is routed via the shareable interface between the AID applet instance AIO AID and the applet instance A to MO A to the applet instance AIO A of the applet A. A possible response AW from the applet instance AIO A is routed back to the AID applet instance MO AID via the shareable interface and made available to the contactless interface CL of the card device.

When an APDU command comes in at the card device contactlessly in the international space, thus the international applet A is employed. Thus, contactless CL payment transactions in the international space are carried out by the international applet A. According to the further lines of the relaying table T (line 2), international (int) contact-type C payment transactions are processed by the international applet A. (Line 3) Payment transactions carried out in contact-type manner C in the home country (dom) C are carried out by the home country applet B. (Line 4) Payment transactions carried out contactlessly in the home country (dom) are carried out by the home country applet B.

According to FIG. 1, all international payment transactions are carried out with the applet A, and all payment transactions in the home country (domestic) with the applet B, irrespective of the contacting type, contactless or contact-type. This would also be possible without evaluating the contacting type as a condition. However, the relaying system illustrated by means of FIG. 1 also allows other, more individual, relaying models, as will be explained below by means of FIG. 2.

FIG. 2 shows a variation of the card device from FIG. 2, according to embodiments of the invention. In FIG. 2, the two lower lines of the relaying table T differ from the relaying table T of FIG. 1; the two upper lines are identical.

The objective of the embodiments of FIG. 2 is that in the home country dom only contact-type C payment transactions should be processed by the home country applet B. In contrast, payment transactions carried out in the home country dom contactlessly CL should be processed by the international applet A. On the other hand, regardless of the contacting type, contactless CL or contact-type C, payment transactions carried out in the international space int should always be carried out with the international applet A.

According to FIG. 2, line three, an APDU command coming in in contact-type C fashion in the home country dom, said APDU command containing AID B, is routed directly to the applet instance AIO B of the home country applet B. Thus, the contact-type payment transaction in the home country is carried out with the home country applet B.

According to FIG. 2, line four, an APDU command coming in contactlessly CL, said APDU command containing AID X, is routed to the AIO AID applet instance of the AID applet, and is routed thereby to the applet instance AIO A of the international applet A. Thus, the effect is achieved that contactless payments are always carried out with the international applet A. Conventionally, to achieve this effect, an additional applet instance of the applet A would have to be installed in the card device.

According to alternative embodiments of the invention, for example, contact-type payment transactions in the international space, which would normally be carried out by the international applet A, are re-routed to the home country applet B by means of an AID X and an entry AID X+C+int→applet B in the relaying table T. Thus, contact-type C payment transactions are always carried out with the home country applet B, even if they take place in the international space. Of course, for this purpose, the relaying table T then must not contain the entry of line 2 shown in FIG. 2. For this entry AID A+C+int→applet A causes a mandatory direct routing of contact-type C payment transactions in the international space to the international applet A.

It is therefore advantageous if the entries in the relaying table T are mutually coordinated, in accordance with a desired objective.

CITED PRIOR ART

[1] [GPC_SPE_034] Global Card Platform Specification V2.2.1, 2011

The invention claimed is:

1. A card device comprising a non-volatile memory area, wherein in the non-volatile memory area there are installed:
at least one applet instance of at least one applet, each of the at least one applet being a functional applet;
an applet identifier (AID) for each of the at least one applet instance installed, each AID being associated with the respective applet instance;
an AID applet instance of an AID applet, the AID applet instance including an interface unit for communication with each of the at least one applet, the AID applet instance itself not being a functional applet;
an interface unit to the AID applet in each installed applet configured to be able to communicate with the AID applet;
an AID applet identifier AID associated with the AID applet instance; and
a relaying table comprising:
one or more combinations of the AID applet identifier AID associated with one or more conditions of commands coming in at the card device; and
for each of said one or more combinations: a specification of one of the at least one applet and/or of one of the at least one applet instance to which the command is to be forwarded if this combination is given,
wherein the AID applet instance, based on the relaying table, under different conditions of the commands coming in at the card device, provides different relaying options to relay a command to one of the at least one applet instance, a single instance of the at least one applet being provided for different relaying options such that the card device is configured that one command coming in at the card device addresses the at least one applet instance in at least two different ways by the different relaying options due to the different conditions.

2. The card device according to claim 1, wherein the interface unit of the AID applet instance comprises a shareable interface of the applet instance, and forwarding the command in accordance with the conditions in the relaying table to the applet instance via the shareable interface.

3. The card device according to claim 1, wherein the interface unit of the AID applet instance comprises a return functionality that is set up in response to a command relayed by the AID applet instance to transmit response data from the applet instance to the AID applet instance via the interface unit of the AID applet instance.

4. The card device according to claim 1, wherein as a condition a combination of two or more of the following is provided:
contacting type, including contactless or contact-type, between the card device and a terminal set up for operation of the card device;
country of operation of the card device;
country relationship, including domestic or abroad, between a country of operation of the card device and a home country of the card device in which the card device is registered.

5. The card device according to claim 1, wherein the card device is configured in Java Card technology or in native code technology.

6. The card device according to claim 1, wherein each installed applet instance is additionally set up to directly receive commands containing the AID.

7. The card device according to claim 1, wherein:
an applet instance of a first applet is provided for international operation of the card device outside of a home country in which the card device is registered; or
an applet instance of a second applet is provided for domestic operation of the card device in the home country in which the card device is registered.

8. The card device according to claim 1, wherein as a condition the following is provided:
contacting type, including contactless or contact-type, between the card device and a terminal set up for operation of the card device.

9. The card device according to claim 1, wherein as a condition the following is provided:
a country of operation of the card device.

10. The card device according to claim 1, wherein as a condition the following is provided:
a country relationship, including domestic or abroad, between a country of operation of the card device and a home country of the card device in which the card device is registered.

11. The card device according to claim 1, wherein each installed applet instance is additionally set up to directly receive commands containing the AID without relaying by the AID applet instance.

12. The card device according to claim 1, wherein:
an applet instance of a first applet is provided for international operation of the card device outside of a home country in which the card device is registered; and
an applet instance of a second applet is provided for domestic operation of the card device in the home country in which the card device is registered.

13. The card device according to claim 1, wherein entries in the relaying table are mutually coordinated.

14. A method, in a card device, for relaying a command coming in at the card device from outside the card device; the card device comprising a non-volatile memory area, wherein in the non-volatile memory area there are installed
at least one applet instance of at least one applet, each of the at least one applet being a functional applet;
an applet identifier (AID) for each of the at least one installed applet instance, each AID being associated with the respective applet instance;
an AID applet instance of an AID applet, the AID applet instance including an interface unit for communication with each of the at least one applet, the AID applet instance itself not being a functional applet;
an interface unit to the AID applet in each installed applet configured to be able to communicate with the AID applet;
an AID applet identifier AID associated with the AID applet instance; and
a relaying table comprising
one or more combinations of the AID applet identifier AID associated with one or more conditions of commands coming in at the card device; and
for each of said one or more combinations: a specification of one of the at least one applet and/or of one of the at least one applet instance to which the command is to be forwarded if this combination is given,
the method comprising:
receiving a command that includes an AID applet identifier AID of the AID applet under one or more conditions, wherein the AID applet identifier AID and the one or more conditions correspond to an entry in the relaying table; and
forwarding the command to an applet instance in accordance with the entry in the relaying table, wherein the AID applet instance, based on the relaying table, under different conditions of commands coming in at the card device, provides different relaying options to forward one of the commands coming in at the card device to one of the at least one applet instance, a single instance of the at least one applet being provided for different relaying options such that the card device is configured that the one command coming in at the card device addresses the at least one applet instance in at least two different ways by the different relaying options due to the different conditions.

15. The method according to claim 14, wherein the interface unit of the AID applet instance comprises a return functionality which, in response to a command relayed by the AID applet instance, transmits response data from the applet instance to the AID applet instance via the interface unit of the AID applet instance.

16. A card device comprising:
one or more non-volatile memory areas storing at least one
applet instance of at least of at least one applet, an AID applet, and a relaying table, wherein each of the at least one applet is a functional applet; and
a relaying device that is set up, with respect to commands coming in at the card device under an AID identifier of the AID applet and under different conditions, to:
accept the command coming in at the card device at the AID applet, and relay the command coming in at the card device to a functional applet in accordance with the relaying table,
wherein an AID applet instance of the AID applet is stored in the one or more nonvolatile memory areas, the AID applet instance itself not being a functional applet, and
wherein the AID applet instance, based on the relaying table, under different conditions coming in at the card device, provides different relaying options to relay a command to one of the at least one applet instance, a single instance of the at least one applet being provided for different relaying options such that the card device is configured that one command coming in at the card device addresses the at least one applet instance in at least two different ways by the different relaying options due to the different conditions.

* * * * *